(12) United States Patent
Dillavou et al.

(10) Patent No.: US 12,462,202 B2
(45) Date of Patent: Nov. 4, 2025

(54) COUPLED NETWORKS FOR PHYSICS-BASED MACHINE LEARNING

(71) Applicant: THE TRUSTEES OF THE UNIVERSITY OF PENNSYLVANIA, Philadelphia, PA (US)

(72) Inventors: Samuel Dillavou, Philadelphia, PA (US); Douglas Durian, Swarthmore, PA (US); Andrea J. Liu, Philadelphia, PA (US); Menachem Stern, Philadelphia, PA (US); Marc Z. Miskin, Media, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 839 days.

(21) Appl. No.: 17/750,072

(22) Filed: May 20, 2022

(65) Prior Publication Data
US 2022/0383205 A1    Dec. 1, 2022

Related U.S. Application Data

(60) Provisional application No. 63/191,468, filed on May 21, 2021.

(51) Int. Cl.
*G06N 20/20*    (2019.01)
(52) U.S. Cl.
CPC ................... *G06N 20/20* (2019.01)
(58) Field of Classification Search
CPC .................................. G06N 20/20
USPC ........................................... 706/12
See application file for complete search history.

(56) References Cited

U.S. PATENT DOCUMENTS 11,423,303 B1 *  8/2022  Jiao ................. H03G 5/165
2015/0339570 A1 * 11/2015  Scheffler ............. G06N 3/04
                                                   706/27

OTHER PUBLICATIONS

Xu, et al., "Coupled-learning convolutional neural networks for object recognition", Multimed Tools Appl (2019) 78:573-589, 2019 (Year: 2019).*

(Continued)

*Primary Examiner* — Tsu-Chang Lee
(74) *Attorney, Agent, or Firm* — BakerHostetler

(57) ABSTRACT

A system for physics-based learning and computation including two networks, each having a plurality of identical edges and feedback circuitry to compare the voltage drop at a given edge of the first network with the voltage drop at the corresponding edge of the second network. In both networks, at least one corresponding node is designated for input and at least one corresponding node is designated for output. In the first network, the at least one output node remains free and produces output voltage in response to the input voltage(s). In the second network, the at least one output node is clamped at voltage(s) closer to the desired value for the specified input voltage(s). Feedback circuitry compares voltages across corresponding edges and adjusts their effective resistances in order to learn.

19 Claims, 11 Drawing Sheets

(56) References Cited

OTHER PUBLICATIONS

Selskii, et al., "Synchronization of heteroclinic circuits through learning in coupled neural networks", Regular and Chaotic Dynamics, 2016, vol. 21, No. 1, pp. 97-106 (Year: 2016).*
Barkan, et al., "Design of coupling resistor networks for neural network hardware", IEEE Transactions on circuits and systems, vol. 37, No. 6, Jun. 1990 (Year: 2990).*
Dillavou, S. et al., "Laboratory Demonstration of Decentralized, Physics-Driven Learning", Department of Physics and Astronomy, Jun. 24, 2022.

* cited by examiner

COUPLED NETWORKS FOR PHYSICS-BASED MACHINE LEARNING

CROSS-REFERENCE TO RELATED APPLICATION

This application claims the benefit of U.S. Provisional Patent Application No. 63/191,468, filed May 21, 2021, which is herein incorporated by reference in its entirety.

STATEMENT OF GOVERNMENT INTEREST

This invention was made with government support under MRSEC/DMR-1720530 and DMR-2005749 awarded by the National Science Foundation and DE-SC0020963 awarded by the Department of Energy. The government has certain rights in the invention.

BACKGROUND

The disclosed subject matter relates to systems and methods for a physics-based learning network to engage in certain pattern recognition and computational tasks.

Artificial neural networks (ANNs) can be powerful tools used extensively in daily life as well as for both research and practice in nearly every field of academic study.

However, these neural networks can be distinct from their namesakes—neuron networks—in several ways. ANNs can be less complex and hence better understood than the networks of real neurons firing within the human brain. This relative simplicity can be important to their development, improvement, and efficient use. However, certain ANNs are designed to perform their tasks using a processing unit (e.g. CPU) that trains the network by minimizing a global cost function, while repeatedly storing and retrieving information from a separate electronic memory. This von Neumann architecture can create a computational bottleneck which may not be present in biological networks like the brain. In the brain, individual elements (e.g. synapses) adjust themselves in response to their local environmental stimuli, distributing memory and processing across the entire system. This can allow networks like the brain (which comprises approximately $10^{11}$ neurons and approximately $10^{14}$ synapses) to function at reasonable speed, despite signal propagation timescales millions of times slower than modern computational clock cycles. The ability of synapses to self-adjust—that is to learn via "local rules"—can have an added advantage of allowing brains to recover from immense damage, in stark contrast to the fragility of typical computers.

Certain research in machine learning has attempted to imitate features of neuron networks. To increase the speed and efficiency of existing ANN algorithms, specialized "neuromorphic" hardware can perform backpropagation in a distributed manner, such as combining memory and computation. This effort can be combined with implementation of "biologically plausible" local learning rules that allow for training ANNs.

SUMMARY

The disclosed subject matter provides a system for learning certain tasks. In an example embodiment, a system includes network of connected edges where each edge is identical and is a simple circuit having variable resistors and associated electronics. The system can self-train using local information to perform the same types of tasks as an ANN. Like an ANN, this system transforms some inputs (voltage values at selected input nodes) into outputs (voltage values at selected output nodes) and provides a multiparameter function.

In certain embodiments, the resistances of the edges comprise transient learning degrees of freedom. The learning degrees of freedom as they can be adjusted in order for the system to learn; they are transient in that they are adjustable when the system is learning. Once learning is accomplished, they can be frozen until the system is positioned to learn a new task.

There can be excess learning degrees of freedom to satisfy constraints applied in the tasks such that the system can satisfy all tasks, even if subjected to substantial damage.

A coupled learning approach can be used to adjust the learning degrees of freedom.

In certain embodiments, the system includes a first network, a second network, at least a first input voltage and a second input voltage, a clamped voltage, and feedback circuitry. The first network can have a plurality of electrically connected edges configured to measure voltage drops. Further, the first network can have at least one input node configured to receive an input voltage, and at least one output node configured to produce at least one output voltage. The second network can have a plurality of electrically connected edges configured to measure voltage drops. The second network can have at least one input node configured to receive an input voltage, and at least one output node configured to receive a clamped voltage.

The first and second networks can comprise the same number of electrically connected edges and each of the plurality of edges of the first network corresponds to an identical edge within the plurality of edges of the second network. In this embodiment, the at least first input voltage is applied to the at least one input node of the first network producing at least a first output voltage, a second input voltage is applied to the at least one input node of the second network, and the at least one clamped voltage is applied to the at least one output node of the second network. Further, in this embodiment, the feedback circuitry can compare the voltage drop at an edge of the first network with the voltage drop at an edge of the second network which corresponds with the edge of the first network, and adjust the effective resistances of each of the plurality of connected edges.

In accordance with another embodiment of the disclosed subject matter, an output voltage corresponding to the first network is measured and the clamped voltage is a voltage level between the first output voltage and the desired output voltage.

In accordance with another embodiment of the disclosed subject matter, each of the plurality of edges of the first and second networks is a circuit comprising two digital potentiometers wherein one digital potentiometer is denoted as "free" and one digital potentiometer is denoted as "clamped," two comparators, one XOR gate, one one-bit register, and a plurality of resistors.

In accordance with another embodiment of the disclosed subject matter, each of the plurality of edges of the first and second networks is a circuit comprising at least two analog transistors wherein one analog transistor is denoted as "free" and one analog transistor is denoted as "clamped," four operational amplifiers, one analog cell multiplier, one switch, one charging capacitor, and a plurality of resistors.

In accordance with another embodiment, the first input voltage and the second input voltage are the same.

The disclosed subject matter also provides a circuit for constructing a pair of networks for learning tasks. The circuit can further include a free variable resistor, a clamped variable resistor, and a feedback circuit. The feedback circuit can be configured to measure the voltage drop across each of the resistors and automatically adjust their respective resistances in a predefined manner.

In accordance with another embodiment of the disclosed subject matter, each of the plurality of edges of the first and second networks is a circuit comprising two digital potentiometers wherein one digital potentiometer is denoted as "free" and one digital potentiometer is denoted as "clamped," two comparators, one XOR gate, one one-bit register, and a plurality of resistors.

In accordance with another embodiment of the disclosed subject matter, each of the plurality of edges of the first and second networks is a circuit comprising at least two analog transistors wherein one analog transistor is denoted as "free" and one analog transistor is denoted as "clamped," four operational amplifiers, one analog cell multiplier, one switch, one charging capacitor, and a plurality of resistors.

DETAILED DESCRIPTION

Reference will now be made in detail to the various exemplary embodiments of the disclosed subject matter, exemplary embodiments of which are illustrated in the accompanying figures. These embodiments and figures are given for the purpose of illustration and not limitation.

Figure 1A:
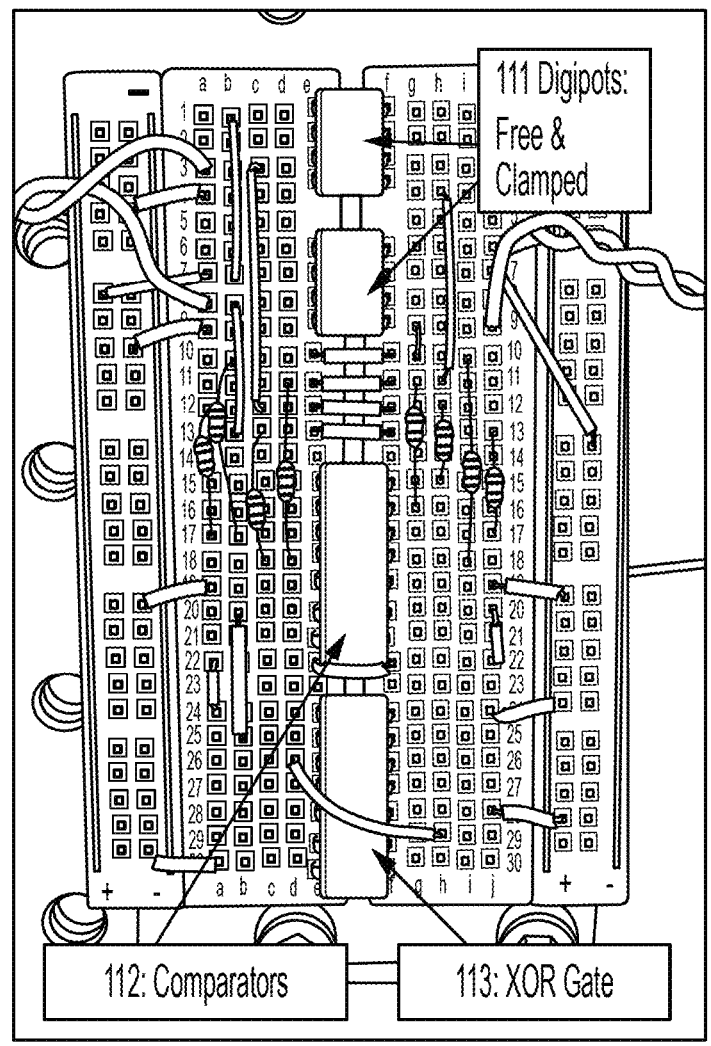
FIGS. 1A-1D illustrate a single edge of a network, in accordance with the disclosed subject matter.
Figure 1B:
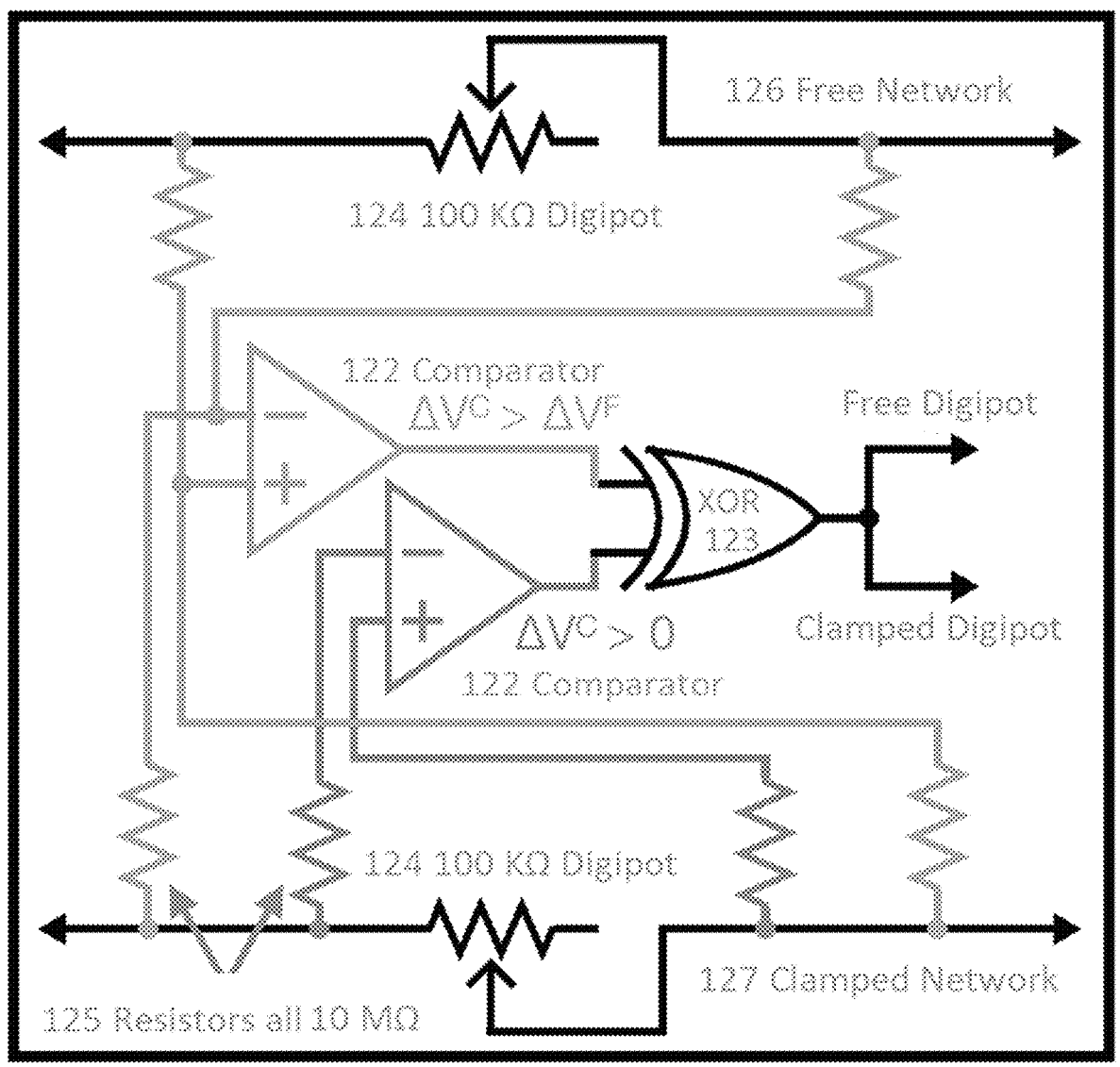
Figure 1C:
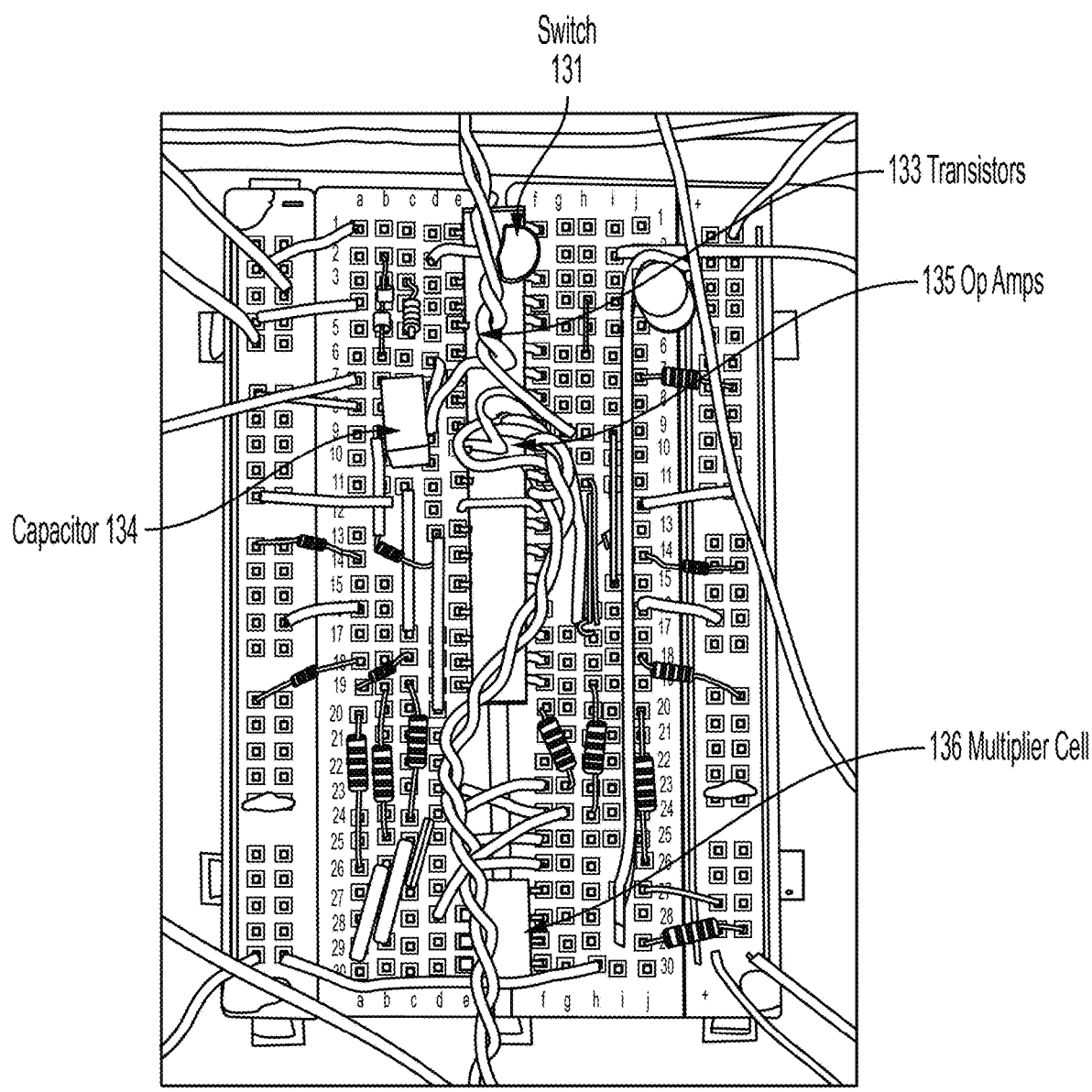
Figure 1D:
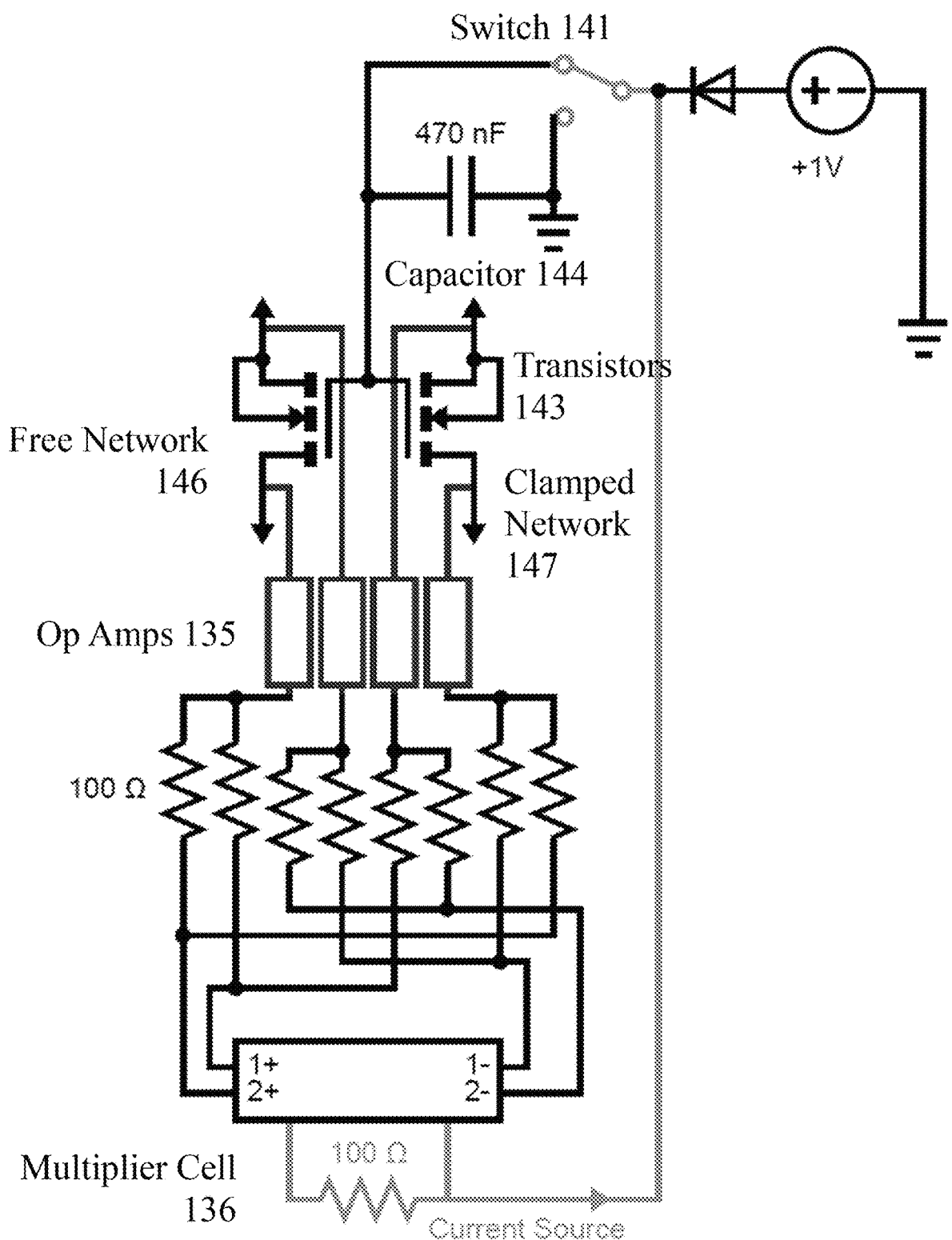

With reference to FIG. 1A, the photograph shows an image of an edge comprising free and clamped digipots 111, comparators 112, and an XOR gate 113, as constructed on a breadboard. With reference to FIG. 1B, the diagram represents a simplified circuit for a single edge, which houses circuitry for both the free and clamped networks 126, 127. Comparators 122 and an XOR gate 123 compute the direction of resistance change based on the relative voltage drops across the free and clamped 100 KΩ digipots 124. The circuit further comprises 10 MΩ resistors 125. With reference to FIG. 1C, the photograph shows an image of an edge comprising switch 131, transistors 133, charging capacitor 134, operational amplifiers 135, and multiplier cell 136. With reference to FIG. 1D, the diagram represents a simplified circuit for a single edge, which houses circuitry for both the free and clamped networks 146, 147. The circuit further comprises switch 141, transistors 143, charging capacitor 144, operational amplifiers 145, and multiplier cell 136.

Figure 2A:
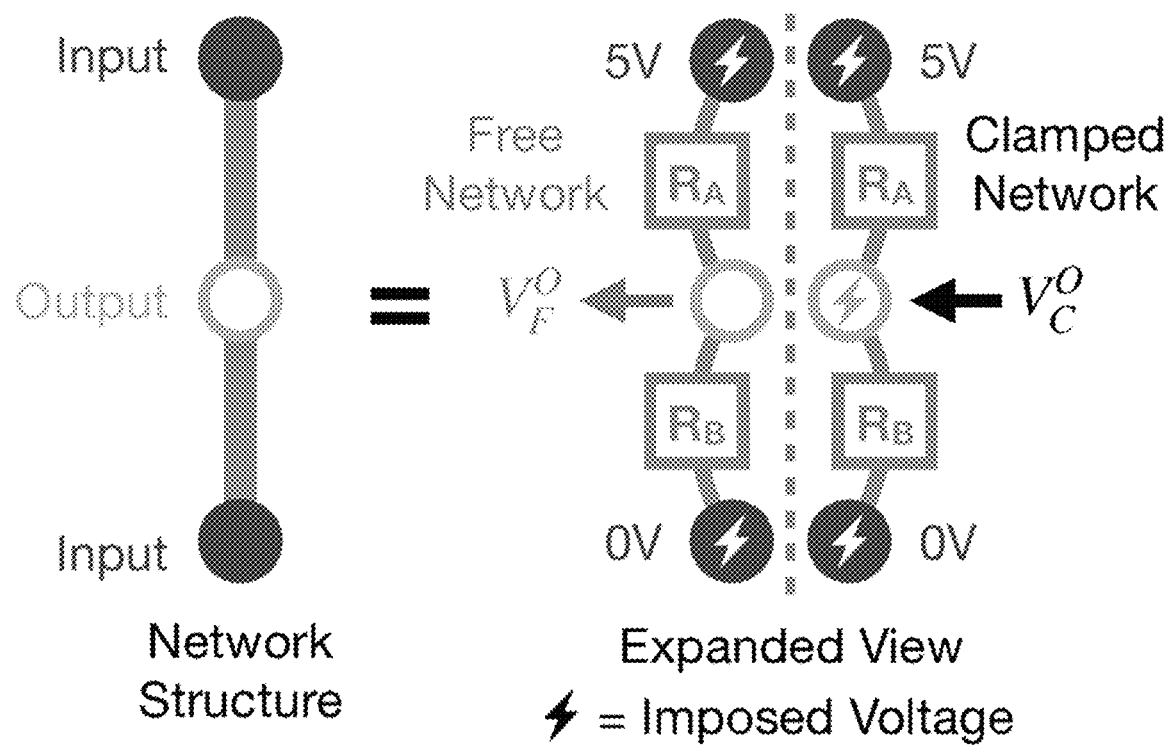
FIGS. 2A-2C illustrate coupled learning in a voltage divider, in accordance with the disclosed subject matter.

With reference to FIG. 2A, the diagram represents a network depicted to show both free (left) and clamped (right) networks. Voltage is imposed on input nodes in both networks, and on output nodes only in the clamped network. The resistance of each edge is identical in both networks.

Figure 2B:
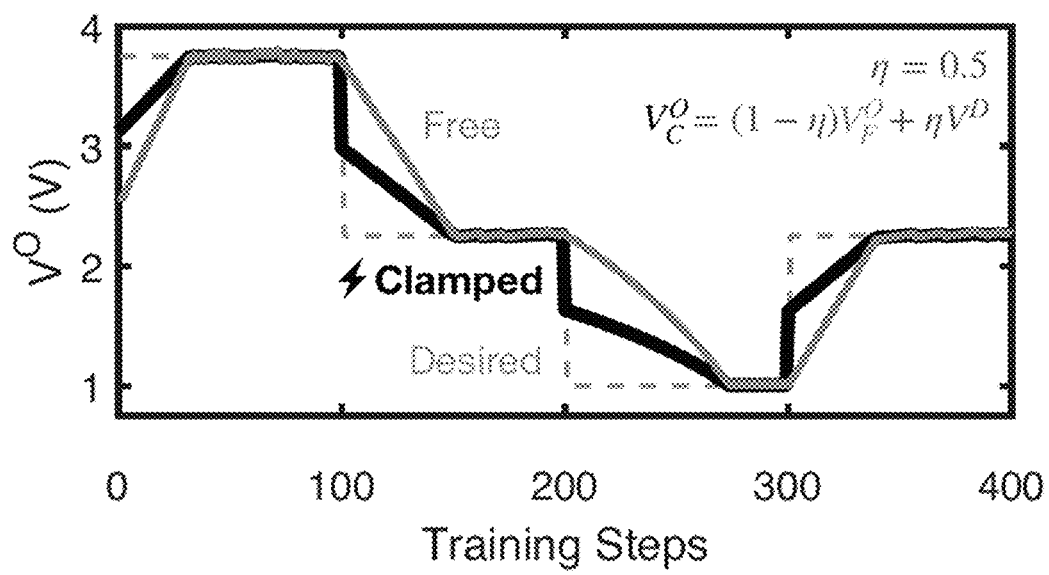
Figure 2C:
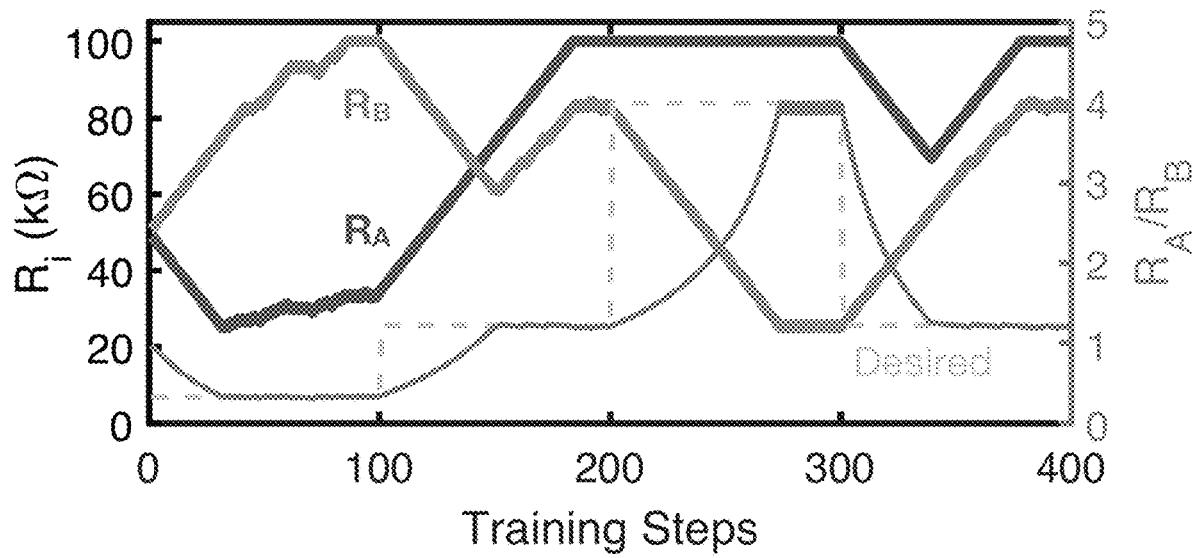

With reference to FIG. 2B, output node voltage is graphed as a function of the number training procedures completed for both free (blue) and clamped (black) networks. The desired voltage, which represents the solution to a machine learning problem, is shown as a gray dashed line. Note that the clamped state effectively guides the free state towards the desired voltage which is changed every 100 procedures, from 3.75 V, to 2.25 V, to 1 V, and finally to 2.25 V. With reference to FIG. 2C, resistance values of the two edges in the network (grays) and their ratio (blue) are graphed as a function of the number of training processes completed. The light blue dashed line represents the ratio that will produce the desired network output.

Figure 3A:
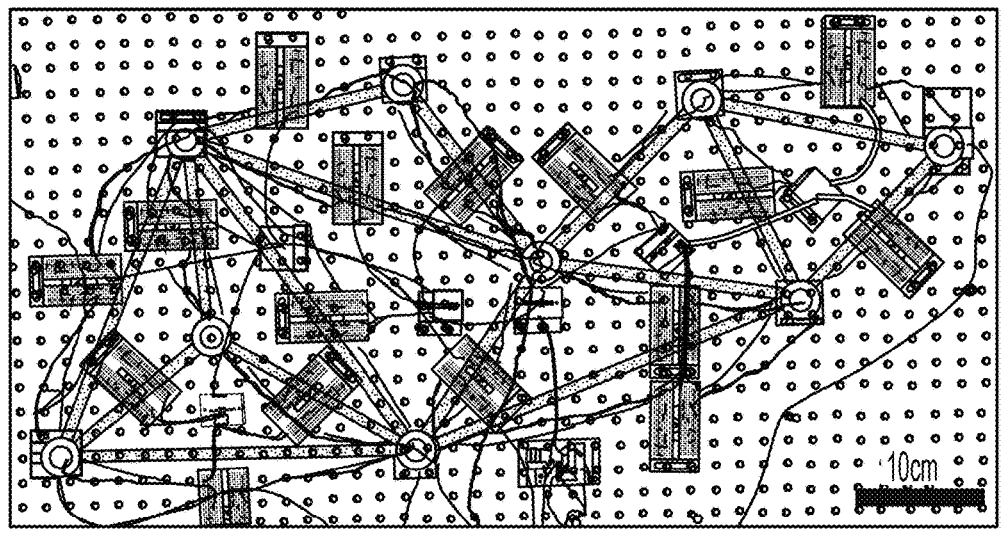
FIGS. 3A-3F illustrate how one physical learning machine can be trained to perform many tasks, in accordance with the disclosed subject matter.
Figure 3B:
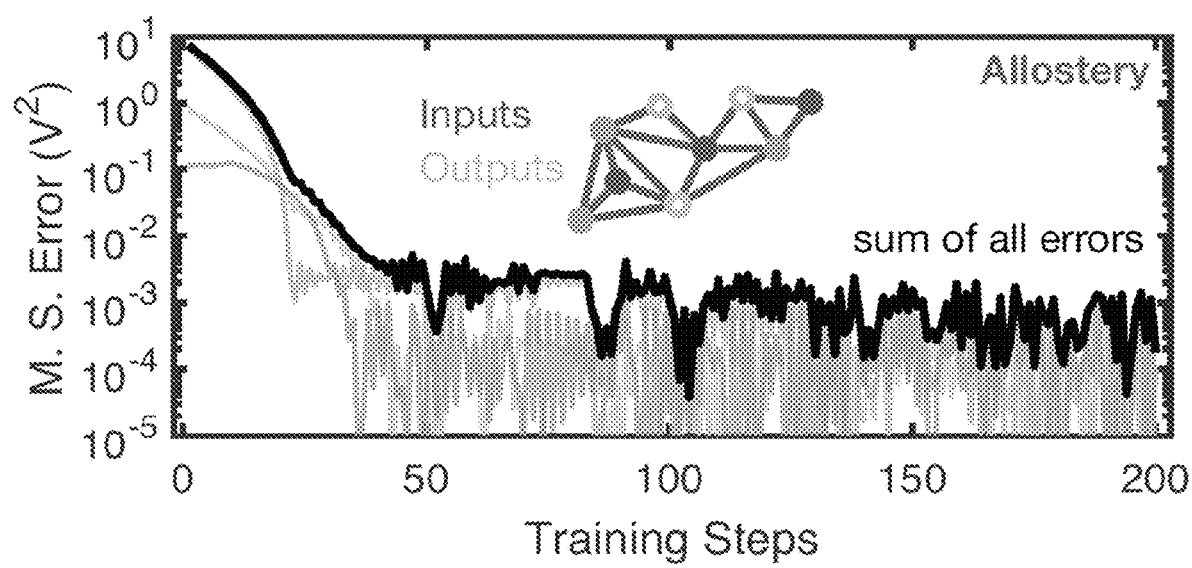
Figure 3C:
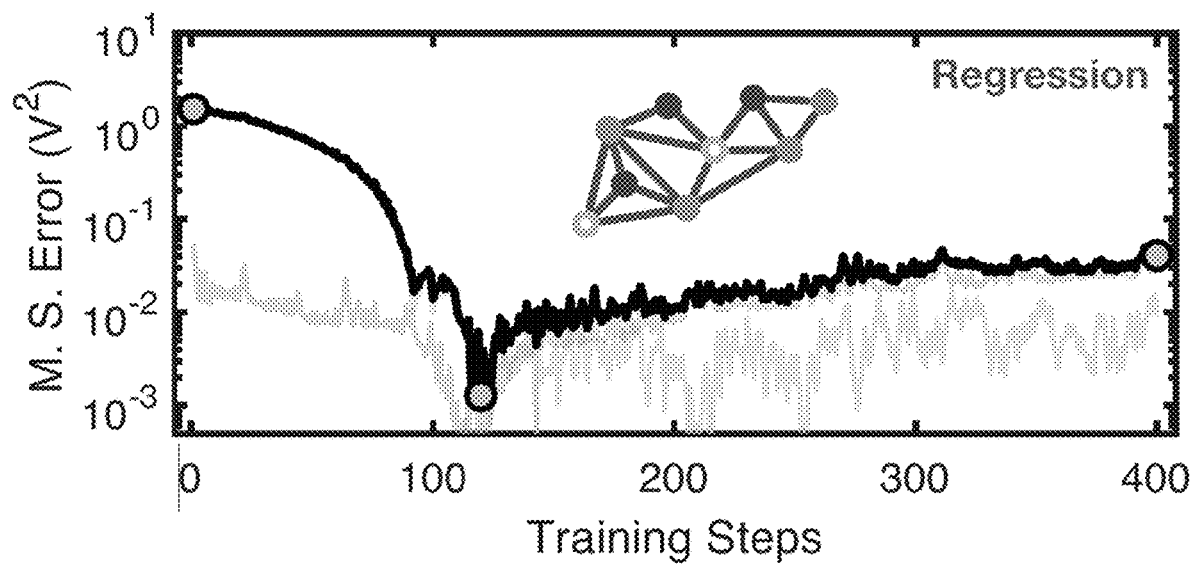
Figure 3D:
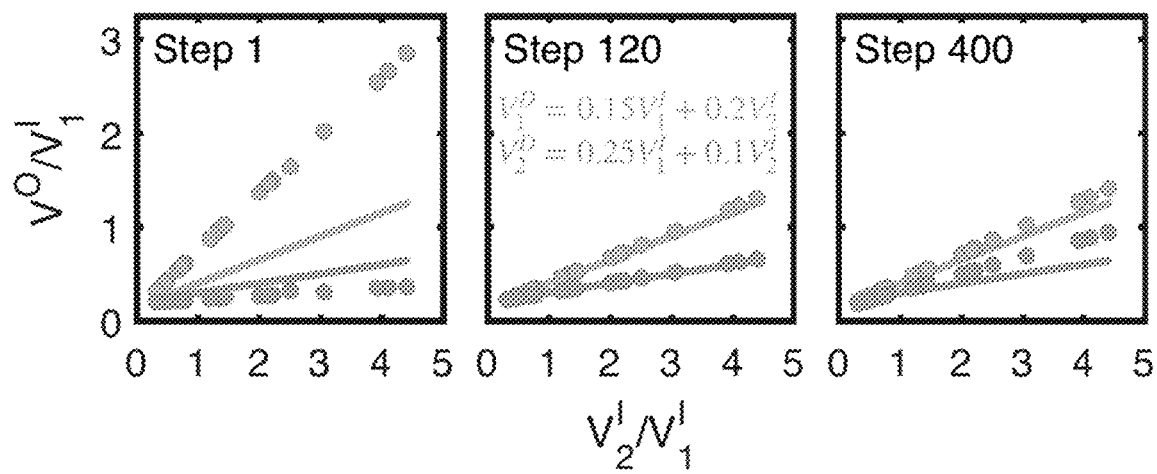
Figure 3E:
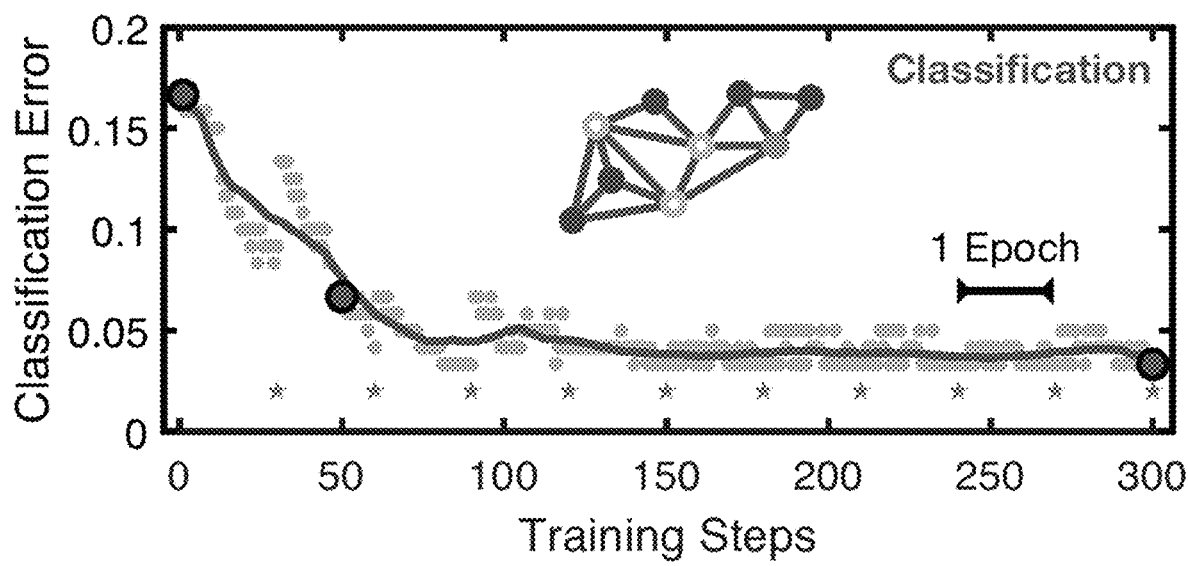
Figure 3F:
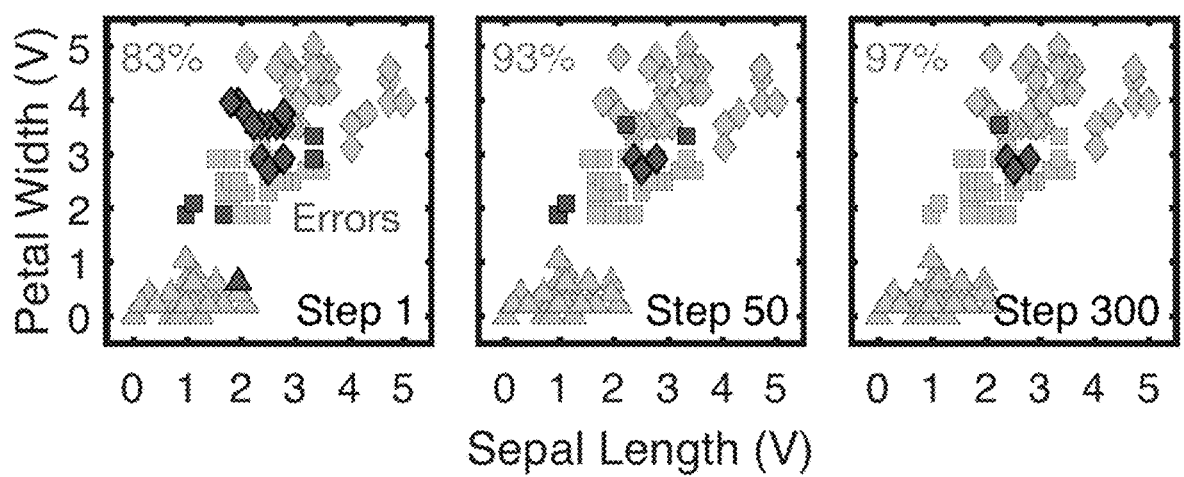

With reference to FIG. 3A, the photograph shows the 16-edge circuitry with the network structure overlaid in white. This network is capable of allostery, regression and classification tasks using different input and output nodes (see FIGS. 3B, 3C, and 3E). In FIG. 3B, mean-squared error for each of three outputs and their sum (black) is graphed as a function of the number of training procedures completed for an example allostery task. In FIG. 3C, mean-squared error for each of two outputs and their sum (black) for a two-parameter regression task is plotted as a function of the number of training procedures completed for each output node. Large yellow circles indicate the snapshots in time shown in FIG. 3D. FIG. 3D illustrates snapshots of the values for both outputs at three procedures during training for the regression task in FIG. 3C. The solid lines indicate the desired output values. The regression task involves two parameters, and thus both axes are scaled by $V_1^I$ to project the results into two dimensions. FIG. 3E depicts test set classification error for the iris benchmark dataset graphed as a function of the number of training procedures completed (faded symbols). Smoothing the data with a window of thirty training procedures (solid line) highlights that the final plateau accuracy is above 95%. Large red circles indicate the training procedures shown in FIG. 3F. The desired voltage for each class is remeasured every epoch, indicated by the gray stars. With reference to FIG. 3F, the plots represent snapshots of the classification success of the test set projected into the 2D space of two of the four inputs (sepal length and petal width, rescaled to 0-5 V). The classes of iris are denoted by marker shape. Further, gray shapes are correctly classified and red shapes are incorrectly classified.

Figure 4A:
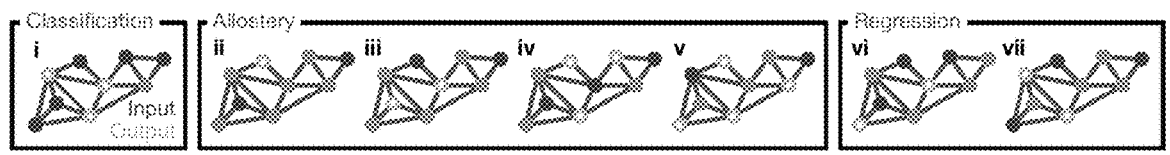
FIGS. 4A-4C illustrate the flexibility of the physical learning machine, in accordance with the disclosed subject matter.
Figure 4B:
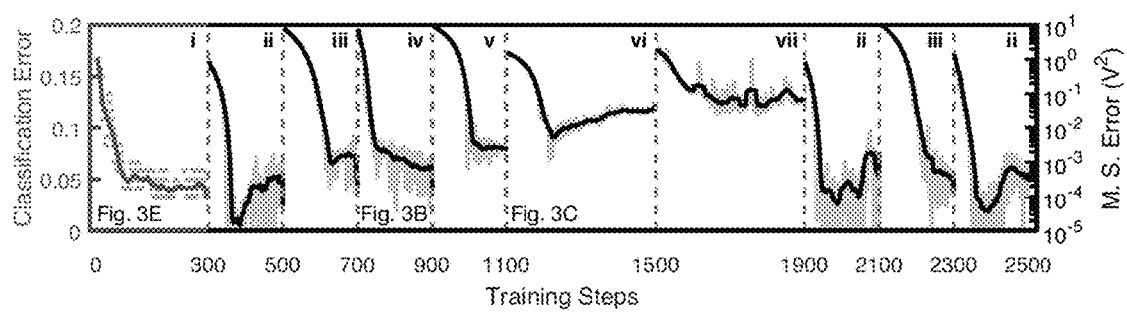
Figure 4C:
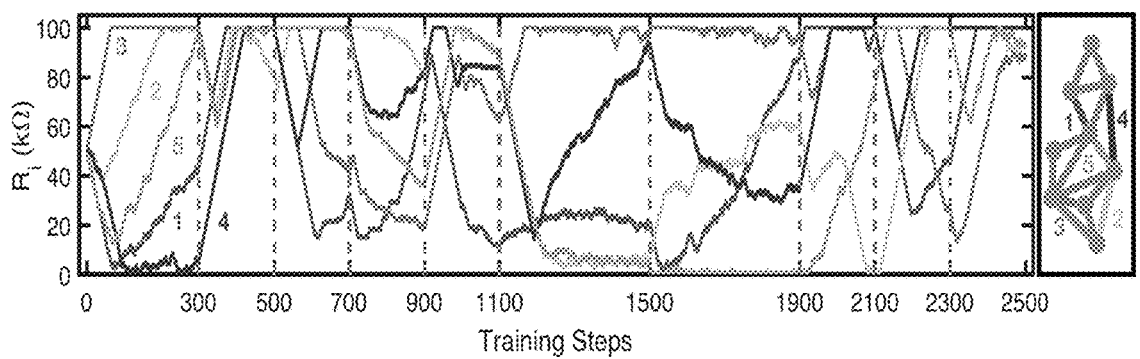

With reference to FIG. 4A, the images represent network structures with input (solid red) and output (orange outlined) nodes indicated for seven distinct tasks, of which one is a classification task (Task (i)), four are allostery tasks (Tasks (ii)-(v)), and two are regression tasks (Tasks (vi) and (vii)). FIG. 3B illustrates classification error (Task (i)) and mean-squared error (Tasks (ii)-(vii)) graphed as a function of number of training procedures completed. Data is smoothed over a window of thirty training procedures, with raw data shown faded in the background. The network performs Tasks (i)-(vii) in order, then Tasks (ii), (iii), and (ii) again. With reference to FIG. 4C, the left graph shows resistance values of five numbered edges over the entire training process. The edge values were not reset between tasks; the right image depicts the network structure with these five numbered edges highlighted.

Figure 5A:
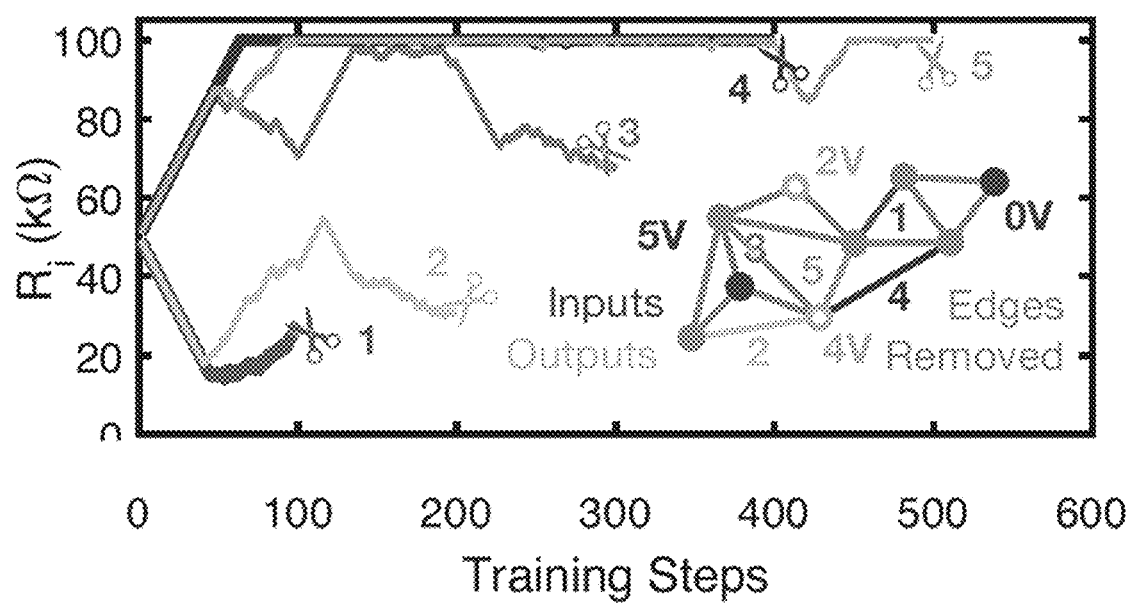
FIGS. 5A and 5B illustrate how the network is resilient to physical damage, in accordance with the disclosed subject matter.
Figure 5B:
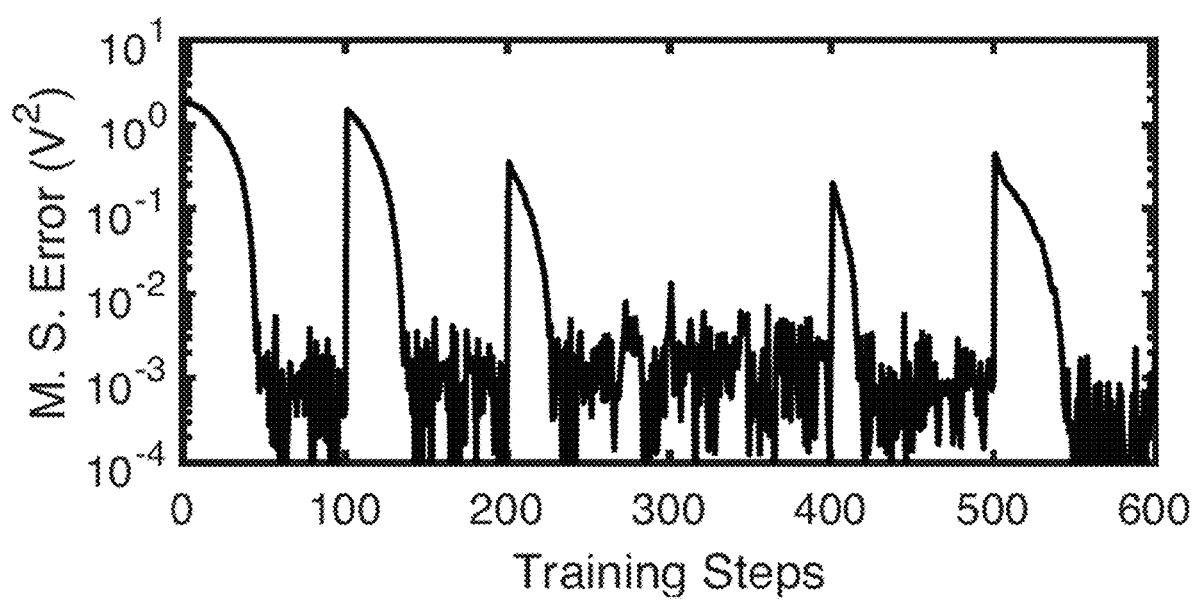

FIG. 5A depicts resistance graphed as a function of training procedures completed for an allosteric task, with edges being cut as the number of completed training procedures increase. In the inset image, a network structure with edges is numbered by order of removal. The voltage values indicate the task being performed. Input nodes are solid red, output nodes are outlined orange. In FIG. 5B, mean-squared error for the allosteric task performed in FIG. 5A is graphed as a function of the number of training procedures completed. Each spike in the graph corresponds to an edge being cut, followed by a swift recovery as the network "repairs" itself.

As has been described, ANNs can learn using CPU cycles, and biological networks can learn using biological processes. In contrast, the disclosed subject matter provides techniques using physical processes in lieu of simulated or biological ones.

Coupled learning is a form of supervised learning designed to be carried out on a physical network, which exploits the physical processes that govern the network in order to perform computation. For example, in an electronic network comprised of nodes connected by variable resistors, when voltages are applied at input nodes I, the voltages at designated output nodes O are automatically determined as functions of the input voltages and the resistance values R of the network edges: $\vec{V}^O = \mathcal{F}(\vec{V}^I, R)$. These output voltages can be 'calculated' rapidly by physical processes that automatically minimize the total power dissipation $P = \Sigma_i (\Delta V_i)^2/R_i$, where $\Delta V_i$ is the voltage drop across an edge i whose resistance is $R_i$. These processes determine not only the output voltages, but the voltages of the remaining nodes that are neither input nor output nodes, also known as "hidden" nodes. In other words, the voltages of hidden and output nodes are automatically adjusted to minimize the power dissipation for a given set of applied input voltages; the system solves this optimization problem to produce the output voltages.

Using coupled learning, a network can learn to perform a task by iteratively adjusting its edges (in this case the electrical resistance of its edges) using only local information. Namely, an edge needs to know the difference in magnitude between the voltage drops in one of the two states. Further, if a digital potentiometer is to be used, the edge must know whether it dissipates more power in one of two states. In one of these states, the free state, the inputs are applied, and the output is measured. Generically, this means that the output is not the desired value. In the clamped state, the same inputs are applied, but the output nodes are clamped at a voltage that is between the incorrect output of the free state and the desired voltage. That is, the clamped state represents a slightly better answer than the free state, but one that takes additional power to generate. The free state output can be moved towards the desired output by modifying the resistance of each edge in proportion to the difference of the power that edge dissipates in these two states. Effectively, each edge makes the clamped state slightly more energetically favorable than the free state. Therefore, when the inputs are next applied, the output moves closer to the clamped state output, which is also closer to the desired output. By repeating this process, a network can be trained to perform a variety of tasks.

In supervised learning, training examples determine the inputs as well as the desired output responses, $\vec{V}^D$, for each example. These desired output voltages can be achieved by adjusting the resistances of all the edges. The resistances $\vec{R}$ can be viewed as learning degrees of freedom that must be adjusted to minimize a cost function, such as the difference between the actual output voltages, $\vec{V}^O$, and desired ones, $\vec{V}^D$ outputs. This cost function can be minimized using gradient descent, common in ANNs. However, this can require a CPU to calculate the global gradient of the cost function to determine the adjustment to each edge.

Coupled learning can avoid this problem by using local rules that determine how the resistance of each edge should be adjusted in order to minimize the cost function. These local rules are based on a comparison of two distinct electrical states imposed on the same network. In the free state, the network attempts the desired task: input voltages $\vec{V}^I$ are applied, and the network calculates or produces output voltages $\vec{V}_F^O$, which are initially different than the desired outputs $\vec{V}^D$ because the resistances are not yet properly chosen. In the clamped state, the same inputs $\vec{V}^I$ are applied, but voltages are also applied at the output nodes; those voltages are clamped at values $\vec{V}_C^O$ closer to the desired values than $\vec{V}_F^O$:

$$\vec{V}_C^O = \eta \vec{V}^D + (1-\eta) \vec{V}_F^O \tag{1}$$

("Eq. 1") where $0 < \eta \leq 1$ is the amplitude of the nudge toward the desired state, and can be considered a hyper-parameter in the language of machine learning. For the given set of applied input voltages, the free state represents the minimal power dissipation state: all of the hidden and output node voltages are adjusted to minimize the total power dissipation. Applying the voltages $\vec{V}_C^O$ in the clamped state lowers the cost function by bringing the output voltages closer to the desired values, but at the cost of increasing the total power dissipation because the output node voltages are clamped at $\vec{V}_C^O$, so only the hidden node voltages can adjust. In coupled learning, resistance values of the network $\vec{R}$ are then adjusted to lower the power dissipation of the (better) clamped state $P^C$ relative to the (worse) free state $P^F$. Specifically, the resistances are updated as:

("Eq. 2")

$$\Delta R_i \propto -\frac{\partial}{\partial R_i}[P^C - P^F] = \frac{1}{R_i^2}[(\Delta V_i^C)^2 - (\Delta V_i^F)^2] \tag{2}$$

where $\Delta V_i^C$ and $\Delta V_i^F$ are the voltage drops in edge i of the clamped and free states respectively. At the limit $\eta \ll 1$, this rule approximates global gradient descent, but does so using only local information at every edge.

A physical network can be built on of Eq. 2, subject to experimental constraints, such that it performs machine learning tasks successfully, adjusting its learning degrees of freedom in an entirely distributed manner without the aid of a central processor. In this physical network, most of the computation is done by physical processes that naturally minimize power dissipation; the remainder is done by a physical learning rule implemented by the circuitry on each edge.

In one embodiment of the disclosed subject matter, the physical network consists of electronic components, using variable resistors as edges of the network. In some embodiments, the variable resistors can be analog transistors; however, the variable resistors can also be AD5220 digital potentiometers wired as rheostats. These "digipots" are not continuously variable as assumed by the coupled learning rule in Eq. 2, but instead have 128 resistance values evenly spaced by $\delta R = 100 K\Omega / 128 \sim 781 \Omega$. Therefore, the evolution of each edge can be restricted to discrete procedures $\pm \delta R$ in either direction. Then, Eq. 2 simplifies to:

("Eq. 3")

$$\Delta R_i = \begin{cases} +\delta R & \text{if } |\Delta V_i^C| > |\Delta V_i^F|, \\ -\delta R & \text{otherwise.} \end{cases} \quad (3)$$

This new, simplified rule is far easier to implement digitally as it only requires a Boolean comparison of voltage drops instead of a difference in power dissipation. However, Eq. 3 still requires access to both the free and clamped electrical states. To this end, the disclosed subject matter comprises two identical networks for comparison, one running the free state and one running the clamped state. Corresponding edges of the free and clamped networks have the same resistance, and are housed on the same breadboard, as depicted in FIG. 1A.

Despite its relative simplicity, however, the absolute value comparison in Eq. 3 can be non-trivial to evaluate electronically. Thus, in some embodiments of the disclosed subject matter, a comparator (integrated circuit) produces a signed comparison $\Delta V_i^C > \Delta V_i^F$. Assuming the two voltage drops have the same sign—which, empirically, is nearly always true—a second comparison, $\Delta V_i^C < 0$, can be used to determine if $\Delta V_i^C > \Delta V_i^F$ is equivalent to $|\Delta V_i^C| > |\Delta V_i^F|$ (positive voltage) or its inverse (negative voltage). The learning rule can now be written using only functions of common feedback circuit components:

("Eq. 4")

$$\Delta R_i = \begin{cases} +\delta R & \text{if } XOR\left[\Delta V_i^C > \Delta V_i^F, 0 < \Delta V_i^C\right] \\ -\delta R & \text{otherwise} \end{cases} \quad (4)$$

In one embodiment of the disclosed subject matter depicted in FIG. 1B, Eq. 4 is implemented with two comparators (LM339AN) and one XOR gate (SN7ALS86N) on each of the plurality of edges. On each edge, the output of the XOR gate is fed back into the up/down input of the variable resistors in both free and clamped networks. All variable resistors in both networks change their values simultaneously, triggered by a global clock signal.

In another embodiment of the disclosed subject matter, each edge of the network comprises a simple circuit built using commercially available, standard integrated circuit components such as, by way of example and in no way limiting, two digital potentiometers (AD5220 100K), two comparators (LM339AN), two XOR gates (SN74ALS86N), a one-bit register, and six 10M Ohm resistors and two 100K Ohm resistors. In some embodiments, the integrated circuit can include analog transistors, four operational amplifiers, an analog multiplier cell, a switch, and a charging capacitor. In either case, the digital potentiometers or analog transistors can be wired as variable resistors. On each edge, one variable resistor is denoted as "free" and one is denoted as "clamped." When the edges are wired together into the network, the A and W (wiper) ports of the free potentiometers are connected to each other, as are the clamped potentiometers to each other. In this way, two separate but identical networks of variable resistors are created, one made entirely of "free" potentiometers and the other made entirely of "clamped" potentiometers.

To train the network to perform a task, the desired input voltages can be applied to the free network and the desired input voltages, as well as clamped output voltages $\vec{V}_C^O$, can be applied to the clamped network. A computer is not needed to communicate instructions to the edges as they are each responsible for their own evolution. In one example, as shown in FIG. 2A, a two-edge network is trained as a voltage divider; the network is asked to produce a single desired voltage $V^D$ at its output (middle) node, while the input nodes (top and bottom) are held at 5 V and 0 V respectively.

To further train the network, the following algorithm can be repeated every clock cycle:
1. Updating the clamped state output node voltage, per Eq. 1.
2. On its own, every edge updates its own resistance, per Eqs. 2 and 4.

In training the network, the clamped state serves as the "supervisor" to tell the network what the (improved) answer is. The supervisor only enters in through the clamped boundary condition; the network itself decides how to achieve this improved answer, as it receives no instructions from the supervisor about which edges to push up or down in resistance. That is, shown the right answer, the network trains itself to produce it. Therefore, even as the size of the network increases, the job of the supervisor does not grow in complexity; it is always given by Eq. 1. By contrast, in ANNs, the CPU must perform more and more onerous gradient calculations to train increasingly larger networks.

As previously described, edges are wired such that they increment their resistance to bias the electrical state of the system away from the free state and towards the clamped state. This results in the free state output voltage(s) 'following' the clamped state voltages, which in turn move progressively towards the desired voltage in procedures determined by $\eta$. This is illustrated for the voltage divider example in FIG. 2B, where the desired voltage was changed every 100 training procedures. At the start, all edges are initialized at the center of their resistance ranges (~50 k$\Omega$). Two phases in each training are evident in FIG. 2C. At first, the clamped and free networks are quite different, and the two edges evolve in opposite directions until the desired voltage is achieved. Once the network has reduced the error sufficiently, noise dominates the signal to the comparators, which have small bias resulting in occasional incorrect evaluations when comparing two values differing by less than 0.01 V. The combination of noise and bias creates an error floor, but also allows the network to explore the phase space of approximately valid solutions. This is seen by the ratio of the two resistance values, as depicted by the blue line in FIG. 2C, which remains approximately constant at its ideal value while both resistance values drift. For more complex networks and tasks this stochasticity may be useful; similar exploration of the available solutions space can promote generalization in both biological and artificial networks.

The flexibility of the coupled learning circuitry can be demonstrated by training the 16-edge network depicted in FIG. 3A to perform three types of tasks, inspired respectively by biology (allostery), mathematics (regression), and computer science (classification). In this way, the network can switch between these tasks on demand, including adapting to new input and output node selections. It is further shown that unlike traditional computers, the system can recover extremely well from physical damage, even when large portions of the original network are destroyed.

Allostery, or allosteric functionality, is a common feature of proteins. In protein allostery, an input signal, namely strain applied to a local region of the protein by binding a regulatory molecule, gives rise to a desired strain or conformational change elsewhere in the folded structure, enabling or preventing binding of a substrate molecule. In a related problem called "flow allostery," a pressure drop in one region of a flow network, such as the pressure drop across input arteries in the brain vascular network, gives rise to desired pressure drops elsewhere in the brain at designated target or output locations that can be quite distant from the input arteries. In the context of electrical networks, allostery corresponds to producing specified output voltages in response to given input voltages. Such functionality can be useful for tasks such as allocating power to various connected devices.

In one example, a three-input, three-output allosteric task, with placement of the input and output nodes is indicated in the inset of FIG. 3B. Using $\eta=0.5$, the network successfully learns to deliver 3 V at all output nodes, in response to input voltages of 5, 1, and 0 V. As further depicted in FIG. 3B, the mean-squared error for this task drops during the learning process by over four orders of magnitude.

Regression can be a more difficult test for the network because the desired output voltages are not constants, but rather functions of the input voltages. To perform a regression, the network solves two equations for two unknowns, choosing two two-parameter linear regression functions for the network to solve simultaneously:

$$V_1^D = 0.15 V_1^I + 0.2 V_2^I \quad V_2^D = 0.25 V_1^I + 0.1 V_2^I \quad (5)$$

("Eq. 5"). Next, a data set of 420 randomly chosen input pair values between 1 and 5 V is generated and the desired voltage for each input pair is calculated using the above equations. Input and output node locations are shown in the inset of FIG. 3C, with one input node set at 0 V to remove the freedom for a global shift in voltage. The data is then divided into a training set (400 elements) and a test set (20 elements). Every clock cycle, the network is shown a new example from the training set, and it updates its resistance values accordingly. Between these examples, the network is given the entire test set one by one, and its free state outputs are recorded as an indication of the network's performance. Given these conditions and $\eta=0.2$, the learning machine reduces the mean-squared error for the entire test set by over two orders of magnitude, as plotted in FIG. 3C. FIG. 3D shows that, despite the network's small size, it produces an accurate result. During training, the network finds an extremely good fit to the data around 120, but cannot maintain it due to some combination of noise, over-fitting (more resistors than design constraints), and small bias in the internal feedback circuitry of the edges. The rise in test error before the final plateau is a common feature in machine learning. Because the network is linear, it cannot perform nonlinear regression; however future embodiments can incorporate diodes or other nonlinear elements to achieve this functionality.

Data classification is an even more stringent test of the network. To test classification, the well-known benchmark data set of three species of iris flowers is used. The network is tasked with classifying these flowers based on four measurements: petal and sepal length and width. The network is given 150 flowers to classify: 30 for training (10 of each species) and 120 for testing. Five nodes are designated as input notes (one for each measurement plus one fixed at 2.5 V, again to remove the global shift degree of freedom) and three are designated as output nodes, as shown in the inset of FIG. 3E. A typical classification output scheme in an ANN can designate one output node for each class and train towards producing a 1 at the node of the correct class, and 0s at all other output nodes. However, because this network is linear and not feed-forward such that information can travel between any pair of nodes in both directions, achieving this output basis is not feasible. Instead, the following output basis is chosen. At the start of every epoch (every 30 training procedures), the network's output response to the average input values from each species of flower in the training set is measured. In a linear network, this is identical to calculating the average output values from all elements in the training set, as done in previous theoretical work. During the ensuing epoch, the desired output voltage for each flower is this average response for the appropriate species. At the start of the next epoch, the averages are recalculated. These desired voltages evolve as the network trains, but eventually settle into a consistent set of values. Because these output averages depends solely on training data, they may be useful in the future for determining when to stop training a learning network. Moreover, this averaging method can ensure that the accuracy at the start of training is higher than the expected 33%, since it picks target values with a minimal distance to the data of a given species. Between training procedures, the entire test set of 120 flowers is run through the network, and a flower is considered correctly classified if its three outputs are closest (L2 norm) to the desired outputs of the correct species. FIG. 3E depicts that by using this algorithm with $\eta=0.1$, the network can classify the iris dataset with well over 95% accuracy.

The disclosed subject matter described herein presents several favorable advancements over certain prior art. The first is the ability to learn new tasks. Unlike a simulated network, a physical learning machine is physically manufactured. Therefore, it is far more useful if a given network can switch from one task to another on demand. In the system described herein, there is no imposed direction of information travel as in a feed-forward ANN, so any node can be used as an input node, an output node, or a hidden node. This flexibility is demonstrated in FIG. 4A by having the network perform seven distinct tasks in succession, using a variety of input-output configurations. In this sequence, the 16-edge network performs one classification task (iris data set), four allosteric tasks with numbers of output nodes ranging from one to four, and two two-parameter linear regression tasks. FIG. 4B shows that the network successfully learns each task in turn, as indicated by the reductions in mean-squared error. In FIG. 4C, it can be seen that the edges are not reset between tasks, but simply find new values as the network adjusts to its new task and training examples. Because of this ability to be retrained using any input-output combination, a network can learn tasks it was not specifically designed to perform. This flexibility in part stems from the system's ability to "solve" a problem in multiple ways. In this sequence of tasks, the 16-edge network performs "task 1", an allosteric task with one output, three different times. Referring again to FIG. 4C, each time, the solution involves distinct values of edge resistance $\vec{R}$; furthermore, the network explores this space of approximately equally valid solutions once the noise floor is reached. The network also quickly erases memory of previous tasks, as is typically the case in linear networks, as seen by the similar initial error in performing task 1 each of the three times.

A second useful feature of the network as a learning system is its robustness to damage. Physical systems such as CPUs used to implement computational neural network functions are typically quite fragile. Breaking or removing a piece of the system tends to destroy the ability of the entire system to function. This is in stark contrast to biological systems, which can often function despite massive damage.

For example, given the right conditions, a plucked flower not only survives, but can generate an entirely new plant. Although the system disclosed herein cannot grow new edges, it can easily recover its desired function after substantial damage. Because the system robust to damage, it can be useful for scenarios where the system is exposed to physical danger. In certain embodiments, physics-based learning networks can be easily modified after construction because adding further edges to the network does not require precise placement.

To demonstrate this feature, the network is trained to perform the two-output allosteric task shown in the inset of FIG. 5A. After every 100 procedures, an edge is removed from the network, as indicated by the resistance traces in FIG. 5A, which end when an edge is cut, and the schematic diagram in the inset. During training, the 16-edge network reduces the mean-squared error of the outputs by several orders of magnitude from its initial value, as shown in FIG. 5B. Removing an edge tends to produce an immediate spike in error as the currents adjust to the new network structure. However, the network can recover each time by finding an entirely new solution to the task. This is achievable even after nearly one-third of the network structure is destroyed. Because the network is homogeneous, no edge is special, and no single part of the network is required for its proper functioning.

One of the embodiments of the network described herein comprises 16 edges, each on its own breadboard and taking up several square feet, and can perform training procedures at about 3-5 Hz. However, it will be understood by one having ordinary skill in the art that in other embodiments, the system can be scaled up in the number of edges, down in the size of each edge and up in the frequency of training procedures by several orders of magnitude in each quantity by using the appropriate electronic components, as those skilled in the art will recognize. Furthermore, in some embodiments, potentiometers with more states, as well as logarithmic or pseudo-logarithmic spacing of the resistance values can greatly improve the network flexibility and reduce the error floor. Diodes or other non-linear circuit elements will allow the system to perform currently prohibited operations such as mimicking an XOR gate.

It will be understood by one having ordinary skill in the art that scaling up the size of the network will not increase computation size, as is the case in computational neural networks. In the system disclosed herein, outputs are not computed but are rather physical responses to input stimuli. Furthermore, determining the clamping voltages does not increase in complexity as the network grows. As a result, adding edges to the network does not increase computation time, as all edges perform their own adjustments in parallel. Furthermore, the outputs of the system can be physical responses to inputs, requiring no computation at all. The speed of this process can depend on the physical size of the system and its inherent capacitance, which together determine the timescale at which the voltages reach equilibrium. This timescale can be much faster than the clock cycle time and thus does not affect training time.

We claim:

1. A coupled learning system, comprising:
   at least one feedback circuit associated with (i) a first edge in a first network and (ii) a second edge in a second network, wherein the second edge corresponds to the first edge, and wherein a feedback circuit is configured to:
      determine an electrical state of the first edge in the first network;
      determine an electrical state of the second edge in the second network, wherein the second network receives a clamped input; and
      iteratively adjust, based on the electrical state of the first edge and the electrical state of the second edge, an electrical characteristic of the first edge and the second edge, so as to cause an output associated with the first edge to approach the clamped input.

2. The coupled learning system of claim 1, wherein the electrical state of the first edge is associated with at least one of: a first voltage input, a first current input, and a first physical input, and wherein the electrical state of the second edge is associated with least one of: a second voltage input, a second current input, and a second physical input.

3. The coupled learning system of claim 1, wherein the first network comprises a first plurality of nodes, and wherein the second network comprises a second plurality of nodes corresponding to the first plurality of nodes.

4. The coupled learning system of claim 1, wherein the first network and the second network are structurally identical.

5. The coupled learning system of claim 1, wherein the clamped input comprises a voltage determined from training data associated with a task.

6. The coupled learning system of claim 1, wherein iteratively adjusting the electrical characteristic solves at least one of a classification task, an allosteric task, a regression task, and a sequential task.

7. The coupled learning system of claim 1, wherein the at least one feedback circuit comprises a capacitor.

8. The coupled learning system of claim 1, wherein the electrical characteristic is an effective resistance.

9. The coupled learning system of claim 1, wherein an effective resistance, $\Delta R_i$, of one or more edges iteratively adjusts according to:

$$\Delta R_i = \begin{cases} +\delta R & \text{if } |\Delta V_i^C| > |\Delta V_i^F|, \\ -\delta R & \text{otherwise.} \end{cases}, \text{ or}$$

$$\Delta R_i = \begin{cases} +\delta R & \text{if } XOR\left[\Delta V_i^C > \Delta V_i^F, 0 < \Delta V_i^C\right] \\ -\delta R & \text{otherwise} \end{cases}.$$

wherein $\Delta V_i^F$ corresponds to the electrical state of the first network and $\Delta V_i^C$ corresponds to the electrical state of the second network.

10. The coupled learning system of claim 1, wherein $\Delta \vec{V}_C^O$ corresponds to the clamped input, and wherein $\vec{V}_C^O$ is changed according to:

$$\vec{V}_C^O = \eta \vec{V}^D + (1-\eta)\vec{V}_F^O$$

wherein $\vec{V}^D$ is a desired output, $\vec{V}_F^O$ is the first input, and $0 < \eta \leq 1$.

11. The coupled learning system of claim 1, wherein the first network and the second network have a same number of edges.

12. The coupled learning system of claim 11, wherein the first network and the second network both have 16 edges.

13. The couple learning system of claim 1, wherein the first network and the second network are linear networks.

14. The couple learning system of claim 1, wherein the first network and the second network are non-linear networks.

15. A coupled learning method, comprising:
   determining an electrical state of a first edge in a first network;

determining an electrical state of a second edge in a second network, wherein the second edge corresponds to the first edge, and wherein the second network receives a clamped input; and iteratively adjusting, based on the electrical state of the first edge and the electrical state of the second edge, an electrical characteristic of the first edge and the second edge, so as to cause an output associated with the first edge to approach the clamped input.

16. The coupled learning method of claim 15, wherein the electrical state of the first edge is associated with at least one of: a first voltage input, a first current input, and a first physical input, and wherein the second electrical state is associated with least one of: a second voltage input, a second current input, and a second physical input.

17. The coupled learning method of claim 15, wherein the first network comprises a first plurality of nodes, and wherein the second network comprises a second plurality of nodes corresponding to the first plurality of nodes.

18. The coupled learning method of claim 15, wherein the clamped input comprises at least one voltage determined from training data associated with a task.

19. A non-transitory computer readable storage medium comprising instructions stored thereon, which when executed by a processor cause a computing device to:

determine a first difference between a first edge of a first network and a second edge of a second network, wherein the second edge corresponds to the first edge; and iteratively adjust, based on the first difference, an electrical characteristic of at least one of the first edge of the first network and the second edge of the second network so as to cause a first output of the first network to approach a clamped input provided at the second edge.

* * * * *

UNITED STATES PATENT AND TRADEMARK OFFICE
CERTIFICATE OF CORRECTION

PATENT NO. : 12,462,202 B2
APPLICATION NO. : 17/750072
DATED : November 4, 2025
INVENTOR(S) : Samuel Dillavou et al.

It is certified that error appears in the above-identified patent and that said Letters Patent is hereby corrected as shown below:

In the Specification

Column 7, Line 3-5, Replace:

" $$\Delta R_i = \begin{cases} +\delta R & \text{if } |\Delta V_i^C| > |\Delta V_i^F|, \\ -\delta R & \text{otherwise.} \end{cases}$$ "

With:

-- $$\Delta R_i = \begin{cases} +\delta R \text{ if } |\Delta V_i^C| > |\Delta V_i^F|, \\ -\delta R \text{ otherwise.} \end{cases}$$ --

In the Claims

Column 12, Claim 13, Line 60, Replace:
"couple"
With:
--coupled--

Column 12, Claim 14, Line 62, Replace:
"couple"
With:
--coupled--

Signed and Sealed this
Twenty-third Day of December, 2025

John A. Squires
*Director of the United States Patent and Trademark Office*